A. F. THOMPSON.
FASTENING FOR EYEGLASS LENSES.
APPLICATION FILED JAN. 26, 1915.

1,163,872.

Patented Dec. 14, 1915.

WITNESSES:
C. A. Ellis
G. M. Schumm

INVENTOR
A. F. Thompson
By John M. Chellman
ATTORNEY

UNITED STATES PATENT OFFICE.

ALBERT F. THOMPSON, OF DALLAS, TEXAS.

FASTENING FOR EYEGLASS-LENSES.

1,163,872.  Specification of Letters Patent.  Patented Dec. 14, 1915.

Application filed January 26, 1915. Serial No. 4,420.

*To all whom it may concern:*

Be it known that I, ALBERT F. THOMPSON, a citizen of the United States, residing at Dallas, in the county of Dallas and State of Texas, have invented certain new and useful Improvements in Fastenings for Eyeglass-Lenses, of which the following is a specification.

My invention has relation to an improved fastening for connecting the lenses of an eyeglass or spectacle lens to the bridge of the eye glass frame and in such connection it relates more particularly to the construction and arrangement of parts constituting such a lens fastening.

In the carrying out of my invention there is provided at either end of the bridge, a stud having two substantially crescent shaped wings to overlap the faces of the lens and a curved body adapted to enter a crescent shaped recess formed in the edge or rim of the lens to interlock the stud and bridge with said lens. The wings of the stud may be secured to the faces of the lens either by means of cement or by means of a tightening screw passing through the wings of the stud and the body of the lens.

The nature and scope of my invention will be more fully understood from the following description taken in connection with the accompanying drawings forming part hereof, in which—

Figure 1:
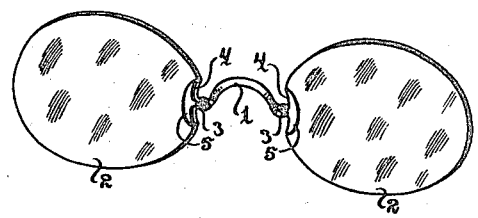
Figure 2:
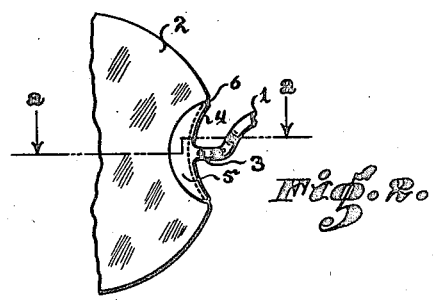
Figure 4:
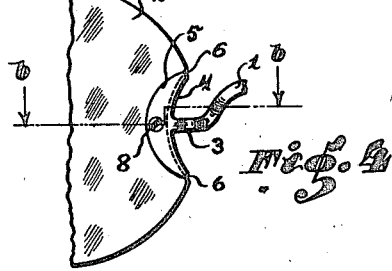
Figure 3:
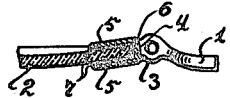

Figure 1 is a perspective view of a pair of eye glasses the lenses of which are united to the bridge by fastenings embodying main features of my invention. Fig. 2 is a side elevational view, enlarged, of the fastening. Fig. 3 is a cross sectional view taken on line a—a of Fig. 2. Fig. 4 is a view similar to Fig. 2 but illustrating a modification of the fastening, and Fig. 5 is a cross sectional view taken on the line b—b of Fig. 4.

Referring to the drawings 1 represents the bridge and 2 the lenses of an eyeglass. To each end of the bridge 1 is soldered or otherwise secured the stud 3. The stud consists of a curved body portion 4 from which projects the integral wings 5. Between the wings 5 the edge or rim of a lens 2 is adapted to be inserted. At the point of insertion in the wings 5 of the stud 3 each lens has its rim or edge cut out as at 6 to form a crescent shaped recess. The curved inner edge of the recess 6 fits snugly upon the complementally curved body portion 4 of the stud 3. This fitting of the curved edge 6 of the lens insures interlocking or interfitting between lens and fastening and prevents loosening of the lens in the fastening should the lens be moved or jarred either in a plane parallel with the face of the lens or in planes parallel with the longitudinal axis of said lens. The wings 5 of the stud overlap the body of the lens 2 and are united thereto in the form illustrated in Figs. 1 to 3 by means of cement 7 interposed between the faces of the lens and the inner face of each wing 5.

Figure 5:
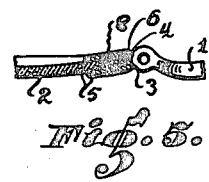

In the form of fastening shown in Figs. 4 and 5 a small screw 8 traverses both wings 5 and the interposed lens to unite the stud to the lens by clamping the wings 5 to the faces of the lens. In either form of fastening the lens 2 interlocks with the stud 3 by reason of the recess 6 fitting snugly upon the complementally curved body 4 of the stud.

While I have shown the improved fastening adapted for use with rimless eyeglasses it is obvious that the same can also be used if desired with glasses in which the edges of the lenses are completely inclosed by a metallic frame. The stud and bridge may be of any suitable metal such for instance as gold, silver, gold plated wire, etc., or they may even be of tortoise shell or similar composition.

By recessing the edge of each lens as at 6 and inserting the stud 3 therein, the pupillary distance is thereby lessened which in the fitting of glasses is a desideratum.

Having thus described the nature and objects of my invention what I claim as new and desire to secure by Letters Patent, is—

1. A fastening for eyeglass lenses and the supporting bridge comprising a crescent shaped stud formed on the end of the bridge and entering a complemental recess formed in the body of the lens and interlocking therewith.

2. A fastening for eyeglass lenses comprising a bridge, a stud having a curved body and wings projecting therefrom and a lens having a crescent shaped recess in its edge, said recess arranged to receive and interlock with the curved body of the stud and said wings adapted to be fastened down upon the faces of the lens.

3. A fastening for eyeglass lenses comprising a bridge, a stud having a curved body and wings projecting therefrom and a lens having a crescent shaped recess in its edge, said recess arranged to receive and interlock with the curved body of the stud combined with means for fastening each wing down upon the body of the lens, to inclose the lens between said wings.

In testimony whereof I have signed my name to this specification in the presence of two subscribing witnesses.

ALBERT F. THOMPSON.

Witnesses:
G. C. WALDROP,
G. SCHUMM.